No Printed Specification Available
6700X
D. Fox,
Brick Machine.
Patented Aug. 15, 1831.
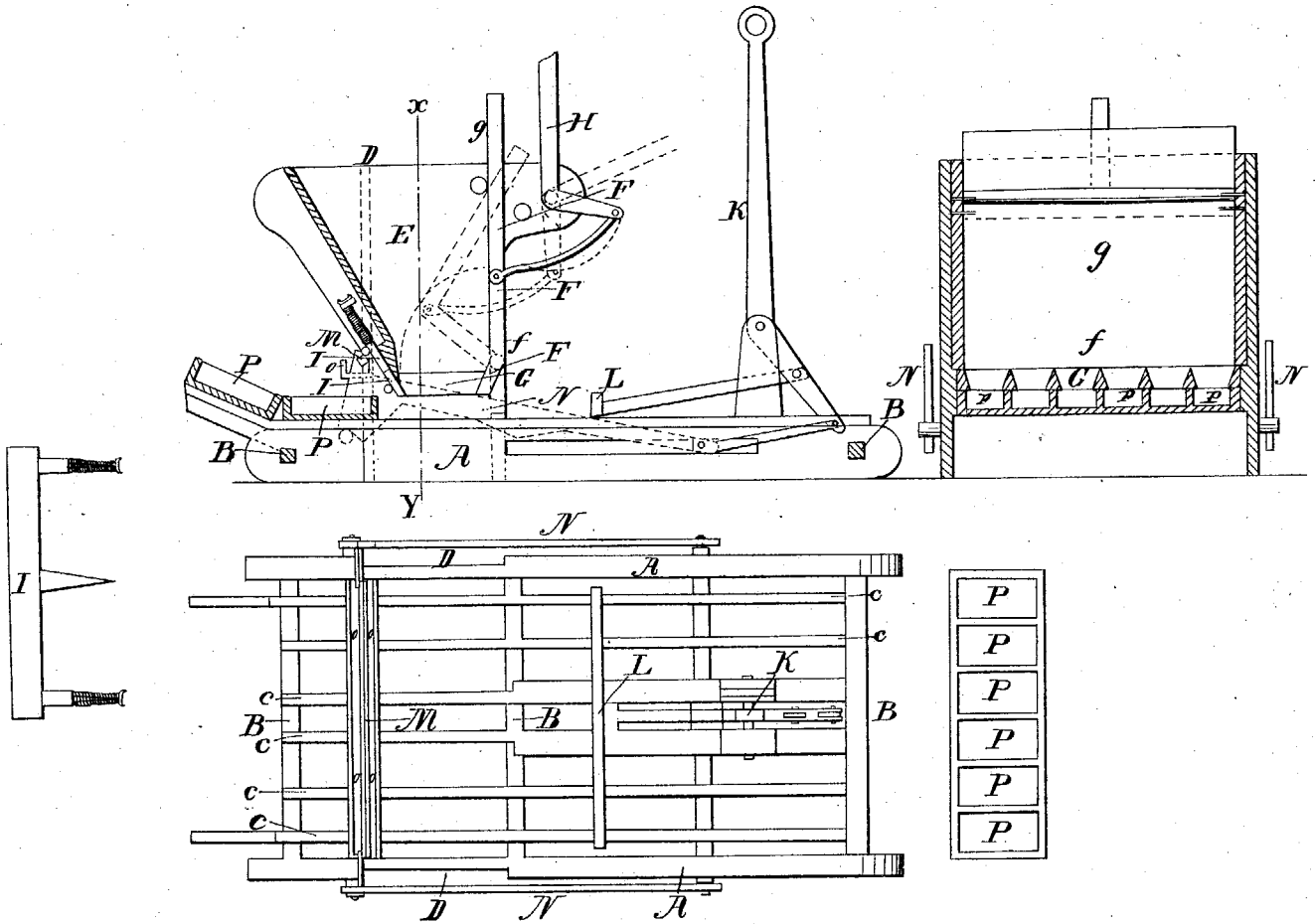
AM. PHOTO-LITHO. CO. N.Y. (OSBORNE'S PROCESS)

6700X

David Fox of Ashtabula, State of Ohio

Letters Patent.

The schedule referred to in these Letters Patent and making part of the same containing a description in the words of the said David Fox himself of his improvement in the Machine for Brick Moulding—

To all to whom these presents shall come

Be it known that I David Fox of Ashtabula, in the County of Ashtabula & State of Ohio, have invented a new and useful improvement in a Machine for Brick Moulding called Fox's Brick Moulder, and that the following is a full & exact description of the construction of said Machine as improved by me.

The Machine consists of a frame or sill work of about six feet in length and of sufficient width to admit the brickmould lengthwise across it of hard timber & framed strongly together by two end sills and one middle sill. From end to end across the middle sill, and framed into the end sills, are mould bearers or slides rising one inch above the sills, the two middle ones of sufficient width to admit frame work into them; two others on each side next the sills are raised with an angle at the extreme back end to prevent the moulds sliding too easily upon them; of these slides, or bearers there are to be a sufficient number to support firmly the moulds upon them. from the side sills near the back end and framed into [illegible] on their outer sides are raised two Stanchions or supporters between which and supported by them, is constructed by board work a hopper to receive the mortar. The back and sides of the hopper remain stationary, the sides perpendicular and the back receding. The front is constructed of three connected pieces, the lower one is fastened near the length of one brick or the width of two from the back and forms part of the generator, or grate work, through which the mortar passes into the moulds, extending a little above the said generator; to this lower piece connected by a [illegible] joint or hinge is another piece, thick and firm of sufficient width to reach, when brought down horizontally nearly across the throat of the hopper called the [illegible] connected to the

6700X upper edge of the press by another round joint is the remaining part of the front
called the follower of sufficient width to reach a number of inches above the
upper edge of the hopper, it being brought down by the operation of the press
This stands towards the front of the machine and follows down bearing against
a roller on its under side a little in front of the follower by another roller
extending from side to side of the hopper is fastened a knee lever obtuse an-
gle 11° from the leg of which a link passes to the top of the press fastened
by a joint. By bringing down this lever to a horizontal position it press
down the press to the same position pressing down the mortar in the throat of the
hopper. behind the lower edge of the hopper back which is chamfered to
an edge is an iron scraper supported in a slant like the hopper back by two
rollers and extending down below the chamfered edge of the back so as just to
clear the top of the brick mould below. To the top of this scraper is a spring or
springs to keep it down in its place unless lifted by some obstruction in the
brick moulds as it passes under it. Near the front end of the machine are
raised two posts framed into the middle mould bearers, between which
8 or 10 inches above is fastened another lever called the principal lever
obtuse angle 145°. across the bearers between the lever and the hopper is a
T shaped timber, called the forcer, the leg or link of which is fastened into the
leg of the principal lever, about midway from the fulcrum to the foot,
The main bar of the forcer is kept square across the machine by a nut
fitting between the middle bearers. The generator or gratework is
constructed of acute triangular bars of sufficient thickness to prevent the
mortar from touching the sides of the brick mould while it is separated and
passed down, The mortar must pass into the middle of the brick mould and
then spread to fill the mould. The bars and also the hopper and brick
moulds must be constructed so as to correspond to each other.

Extending across the machine behind the hopper is a diamond shaped
bar, called the striker fastened to two pieces of timber or board on the out-
er sides of the lower frame work called the regulators, the regulators ex-
tend from the back side of the hopper in a down slanting position to within
about a foot of the lower end of the principal lever to which it is attached
by a T link passing through a long mortise in each [illegible] [illegible] with

6100X its perpendicular fastened to the foot of the lever, the other end of the regulator rests upon an iron or metal roller connected to the sides immediately below a water box which is fastened to the back side of the hopper, in this water box the strike remains when the machine is at rest.

As the regulator moves forward or backward its movement is regulated by its lower edge which is variegated or notched, as it glides upon the roller. The brick moulds are constructed in nearly the same manner, suitable binding pins &c. confine the machine.

In operating this machine, the levers being erect in their resting position an empty mould is placed across between the hopper and forcer upon the slides or bearers, the principal lever is brought down horizontal, which forces the empty mould under the generator & hopper - it is then brought back to its position mortar is thrown in - the knee lever is brought down, the press forcing the mortar into the moulds - again brought back - mortar being at any time thrown in, another empty mould placed in and forced under pressing onward the full one, at the same time the strike is lifted out of the water box, descends upon the middle of the filled mould and going outward smooths one half of the brick, as the principal lever is lifted it moves back comes upon the middle of the mould and smooths the brick wholly. The parts which I claim as my own invention are the strike and press in their construction and movements and also the scraper. The peculiar construction of the forcer, and the peculiar angles of the two rollers. I claim to have improved also the construction of the mould bearers I consider as my invention.

David Fox.

Witnesses
Horace [illegible]
Mason [illegible]

Patented 13 Aug^t 1831.

Ex^d
Ck.J.W.

1260 [illegible]